June 29, 1965　　　　B. L. LOGAN　　　　3,191,672
INSERTABLE SLAG TRAP ADAPTER FOR AUTOMOBILE RADIATORS
Filed March 26, 1962
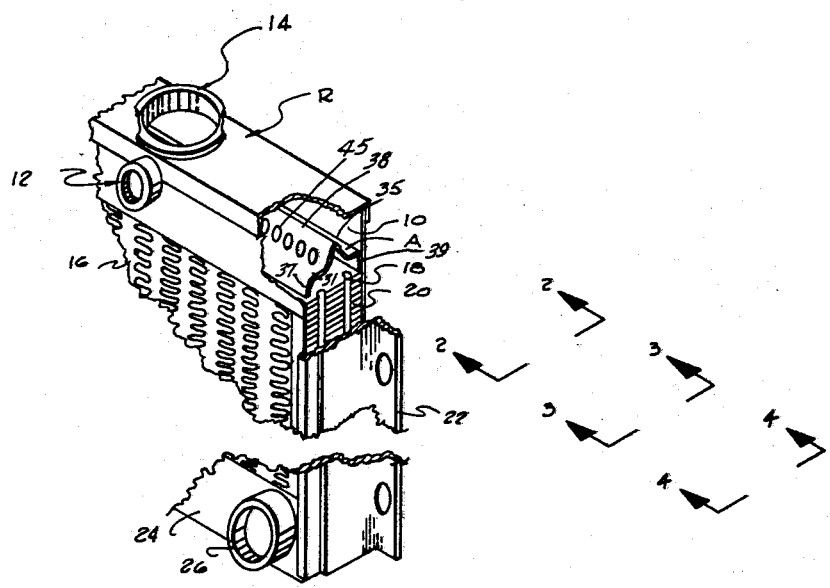
FIG. 1.
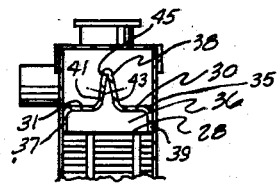
FIG. 2.
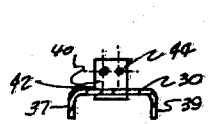
FIG. 7.
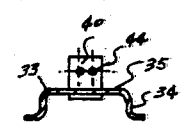
FIG. 8.
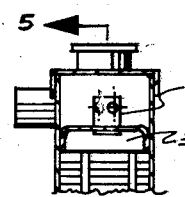
FIG. 3.
FIG. 5.
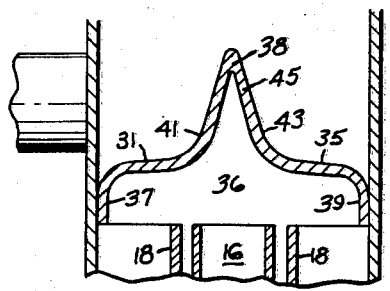
FIG. 9
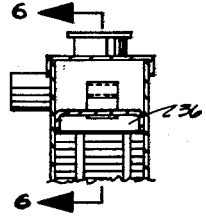
FIG. 4.　FIG. 6.
*INVENTOR.*
BURL L. LOGAN
BY
HERBERT C. SCHULZE
ATTORNEY

United States Patent Office 3,191,672
Patented June 29, 1965

3,191,672
INSERTABLE SLAG TRAP ADAPTER FOR AUTOMOBILE RADIATORS
Burl L. Logan, Blythe, Calif., assignor to Walking Stick Radiators Inc., Blythe, Calif., a corporation of California
Filed Mar. 26, 1962, Ser. No. 182,386
1 Claim. (Cl. 165—119)

This invention relates generally to automotive radiators and particularly to insertable adapters in the upper manifolds thereof for the prevention of block slag circulation into the core as well as uniform coolant distribution therethrough.

One of the main objects of the invention is to provide an adapter insertable in the upper radiator manifold for trapping slag as well as establishing uniform coolant distribution.

Conventional radiators of relatively small size coolant area are plagued with the problem of being clogged by foreign matter such as block slag, rust and sludge of various kinds. Even distribution of coolant fluid through the core is essential but seldom maintained because of clogged tubes and lack of uniform coolant flow. It is a fundamental theory of the present invention to insert an adapter into the upper manifold of radiators that will overcome the problems of clogging block slag and uniform coolant distribution.

Another object of the invention is to provide an insertable slag catching pan that prevents circulation into the core tubes.

Yet another object of the invention is in the provision of an insertable slag pan having multiple coolant circulation orifices that stop sludge movement to the core.

Still another object of the invention is to provide a special sludge and slag trap between the coolant inlet and radiator core.

A further object of the invention is to provide a combined slag trap and coolant flow distributor that forms a fluid pond above the core which is drained evenly therethrough.

A still further object of the invention is in the provision of a slag trap having multiple elevated orifices uniformly delivering coolant fluid to a fluid pool distributed uniformly across the top of the core.

The foregoing and other objects and advantages of the present invention will become apparent to those skilled in the art upon consideration of the following detailed description of the preferred embodiment thereof, reference being had to the accompanying drawings, herein:

FIGURE 1 is a perspective view of the radiator and one modification of insertable adapter;

FIGURE 2 is a sectional view taken on the line 2—2 of FIGURE 1;

FIGURE 3 is a similar sectional view taken on the line 3—3 of FIGURE 1 of a second modification of an adapter insertable in the radiator;

FIGURE 4 is a view similar to FIGURE 3 of a third modification of adapter;

FIGURE 5 is a sectional view taken on the line 5—5 of FIGURE 3;

FIGURE 6 is a sectional view taken on the line 6—6 of FIGURE 4;

FIGURE 7 is an end elevational view of the adapter of FIGURE 3 showing one form of flanged slag pan;

FIGURE 8 is an end elevational view of the adapter of FIGURE 3 showing a second form of flanged slag pan; and FIGURE 9 is a vertical section on a larger scale of the preferred form of the slag trap.

Referring to the drawings, a conventional coolant flow type of automotive radiator R is shown in FIGURE 1. The radiator R has an upper manifold 10 receiving fluid from the conventional inlet 12. A standard filler opening is shown at 14. The upper manifold 10 is attached to the conventional core 16 having coolant tubes 18 and fins 20. Flanged attachment side members 22 are of usual construction. A lower coolant manifold is shown at 24 with the standard coolant outlet 26. A multiple apertured plate 28 is sometimes provided to cover the radiator core 16. All of the elements above described are entirely conventional and merely describe the well-known and conventional structured automotive radiator.

The present invention, several modifications of which are disclosed herein, is directed to an adapter A which is insertable in the upper manifold 10 below the coolant fluid inlet 12. The adapter A may take many forms and various forms have been shown in the drawings. The adapter A comprises a slag or sludge pan or trap 30 having a pair of webs or bases 31 and 35 which lie in the same horizontal plane, each provided at its outer marginal edge with a downwardly extending flange 37 and 39 with an intermediate peaked ridge member 38 between the inner and facing edges of the bases or webs, the peaked ridge member being formed by two walls 41 and 43 which are interconnected at the top edges thereof. The two walls 41 and 43 provide a space therebetween which is in communication with the space included between the webs and the flanges, as shown in FIGURE 2. The pan or trap 30 may take the form 33 with outwardly extending flanges 34. The slag traps 30 and 33 are designed for simple welding attachment within radiator manifolds of different size and shape. The pans 30 and 33 extend entirely across the inner manifold area and provide a partition between the coolant inlet 12 and the radiator core 16.

The slag pans 30 and 33 are elevated above the tubed and finned core 16 to form a coolant pond area 36 extending over the entire upper surface area of the core 16. The pans 30 and 33, irrespective of the nature of their flanged edges may have various forms of upward projections formed thereon having multiple spaced orifices that filter the coolant fluid. The sludge and slag are prevented from exit through the small orifices and the coolant is permitted exit evenly from the pans into the fluid pool 36.

Walls 41 and 43 are each provided with a horizontal row of perforations 45 which extend the length of each wall of the ridge, the perforations lying between the peak of the ridge and the bases or webs 31 and 35. The pan including its ridge is imperforate save and except for the perforations 45 in the walls 41 and 43 and it will be noted that the coolant water entering the inlet 12 will be filtered of slag or sludge upon contact with the walls of the pan and further because the openings or perforations 45 are relatively small. The area of the multiple openings should approximate the area of the inlet 12 so that suction through the lower manifold outlet 26 will draw fluid evenly from the pond 36 through the radiator core 16 for effective cooling.

The pans 30 or 33 may have a plurality of hollowed projections 40 rising from and about apertures 42 formed therein. The multiple projections are shown with plural filter orifices 44 formed in an elevated manner thereon. The modifications, as described, functions exactly as previously described.

The pans 30 or 33, as the case may be, may also have upwardly disposed and laterally bent open ended projections 46 which appear as multiple walking sticks. The open ends 48 thereof may be cut off evenly as desired. As stated before, the actual shape of the pans can be varied. The elevated orificed elements may also be changed as long as they provide fluid pond elevation over the core, slag filtering, and even coolant flow distribution through the radiator core.

The operation of the insertable adapters is believed clear. Their function as filtering flow distributing means results in non-clogging of the radiator tubes, uniform excellent cooling and long life to the conventional radiator.

While I have shown and described in considerable detail what I believe to be the preferred form of my invention, it will be apparent to those skilled in the art that many changes may be made in the shape and arrangement of the several parts without departing from the broad scope of the invention, as defined in the following claim.

I claim:

In an automobile radiator having an upper manifold which has at least two vertical sides and a water inlet, a lower manifold which has a water outlet, and a plurality of vertical tubes leading from the bottom of the upper manifold to the lower manifold, a slag trap and coolant flow distributor, comprising: an elongated piece of fluid impervious sheet metal bent to form a longitudinal ridge of two closely positioned walls each with a horizontal row of closely spaced openings thus providing a narrow elongated entry space between said walls, the elongated piece being bent outwardly from said walls to form two horizontal webs extending to the two vertical sides of the upper manifold and then bent downwardly to form vertical flanges in contact with said manifold sides, means securing said flanges in water-tight sealed relationship with said manifold sides, said trap extending the length of the interior of the upper manifold, the openings in the walls lying above the webs at each side of the ridge and having a total area approximately the same as the area of the water inlet, whereby said webs and flanges form margins of a pool immediately above said vertical tubes and below said narrow entry body whereby to provide an even coolant flow from said pool through the various vertical tubes of the radiator and the slag and scale particles entering the water inlet to the upper tank will tend to be deposited on the two horizontal webs below the level of the two horizontal rows of openings.

References Cited by the Examiner

UNITED STATES PATENTS

| | | | |
|---|---|---|---|
| 1,554,924 | 9/25 | Shapiro | 210—167 X |
| 2,118,344 | 5/38 | Erickson | 165—119 X |
| 2,121,708 | 6/38 | Miguel | 165—119 |
| 2,149,065 | 2/39 | Miguel | 165—153 X |
| 2,343,145 | 2/44 | Heiney | 165—31 |
| 2,498,594 | 2/50 | Tomel | 165—119 |
| 3,004,626 | 10/61 | Brinen | 165—111 X |

FOREIGN PATENTS

| | | |
|---|---|---|
| 184,653 | 8/22 | Great Britain. |

REUBEN FRIEDMAN, *Primary Examiner.*

HARRY B. THORNTON, HERBERT L. MARTIN, ROBERT F. BURNETT, *Examiners.*